(12) United States Patent
Hiwatashi

(10) Patent No.: US 7,702,446 B2
(45) Date of Patent: Apr. 20, 2010

(54) ROAD-SURFACE FRICTION COEFFICIENT ESTIMATING DEVICE AND ROAD-SURFACE FRICTION COEFFICIENT ESTIMATING METHOD

(75) Inventor: Yutaka Hiwatashi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1241 days.

(21) Appl. No.: 10/883,686

(22) Filed: Jul. 6, 2004

(65) Prior Publication Data

US 2005/0010350 A1   Jan. 13, 2005

(30) Foreign Application Priority Data

Jul. 7, 2003   (JP)   ............................. 2003-192797

(51) Int. Cl.
*G06F 17/00*   (2006.01)

(52) U.S. Cl. .............................. 701/80; 701/73; 701/70; 73/9

(58) Field of Classification Search ................... 701/73, 701/80, 70; 340/140, 150, 149; 73/9, 146, 73/10, 105
See application file for complete search history.

(56) References Cited

U.S. PATENT DOCUMENTS

| | | | | |
|---|---|---|---|---|
| 4,651,290 A | * | 3/1987 | Masaki et al. ................. | 701/80 |
| 4,947,332 A | * | 8/1990 | Ghoneim ..................... | 701/84 |
| 4,984,163 A | * | 1/1991 | Kuwana et al. ............... | 701/80 |
| 5,132,906 A | * | 7/1992 | Sol et al. ...................... | 701/80 |
| 5,289,183 A | * | 2/1994 | Hassett et al. ............... | 340/905 |
| 5,765,119 A | * | 6/1998 | Otabe et al. .................. | 701/82 |
| 5,852,243 A | * | 12/1998 | Chang et al. ................. | 73/659 |
| 5,869,753 A | * | 2/1999 | Asanuma et al. .......... | 73/117.01 |
| 5,892,139 A | * | 4/1999 | Miyazaki ....................... | 73/9 |
| 5,902,345 A | * | 5/1999 | Minowa et al. ............... | 701/96 |
| 6,015,192 A | * | 1/2000 | Fukumura ................... | 303/140 |
| 6,122,573 A | * | 9/2000 | Higashi et al. ................ | 701/23 |
| 6,163,747 A | * | 12/2000 | Matsuno ....................... | 701/80 |
| 6,182,001 B1 | * | 1/2001 | Sugai et al. ................... | 701/78 |
| 6,203,121 B1 | * | 3/2001 | Kato et al. .................. | 303/150 |
| 6,317,682 B1 | * | 11/2001 | Ogura et al. ................. | 701/117 |

(Continued)

FOREIGN PATENT DOCUMENTS

EP   1 150 266 A   10/2001

(Continued)

*Primary Examiner*—Thomas G Black
*Assistant Examiner*—Wae Louie
(74) *Attorney, Agent, or Firm*—McGinn IP Law Group PLLC

(57) ABSTRACT

A road surface $\mu$ is updated with time on the basis of a present value (an estimation value E) of the road surface $\mu$ estimated to estimate the road surface $\mu$. In this case, if there is acquired road-surface information in a vehicle travel direction that is detected by a road-side infrastructure, a specifying unit 11 specifies a road-surface friction coefficient based on the road-surface information. An estimating unit 12 sets the road surface $\mu$ ($\mu$inf) thus specified as an initial value, resets the present value of the road surface $\mu$ to the initial value, and then starts estimation of the road-surface friction coefficient based on this initial value. Accordingly, estimation precision of a road-surface friction coefficient is enhanced by using an initial value having high reliability in autonomous estimation of the road-surface friction coefficient.

19 Claims, 4 Drawing Sheets

U.S. PATENT DOCUMENTS

| | | | | |
|---|---|---|---|---|
| 6,326,893 | B1* | 12/2001 | Boschung et al. | 340/601 |
| 6,370,475 | B1* | 4/2002 | Breed et al. | 701/301 |
| 6,385,525 | B2* | 5/2002 | Watanabe et al. | 701/80 |
| 6,522,968 | B1* | 2/2003 | Ito et al. | 701/80 |
| 6,556,912 | B2* | 4/2003 | Matsuno | 701/80 |
| 6,577,943 | B2* | 6/2003 | Nakao et al. | 701/80 |
| 6,597,980 | B2* | 7/2003 | Kogure | 701/80 |
| 6,650,987 | B2* | 11/2003 | Kogure et al. | 701/80 |
| 6,772,058 | B2* | 8/2004 | Miyazaki | 701/71 |
| 6,816,769 | B2* | 11/2004 | Polzin | 701/78 |
| 6,882,921 | B2* | 4/2005 | Priemer et al. | 701/86 |
| 7,234,339 | B2* | 6/2007 | Kogure | 73/9 |
| 2001/0029419 | A1* | 10/2001 | Matsumoto et al. | 701/80 |
| 2001/0045891 | A1* | 11/2001 | Nakao et al. | 340/426 |
| 2002/0120383 | A1* | 8/2002 | Miyazaki | 701/80 |
| 2003/0182045 | A1* | 9/2003 | Miyazaki | 701/70 |
| 2004/0133324 | A1* | 7/2004 | Yasui et al. | 701/41 |
| 2004/0204812 | A1* | 10/2004 | Tran | 701/80 |
| 2005/0010350 | A1* | 1/2005 | Hiwatashi | 701/80 |
| 2005/0065700 | A1* | 3/2005 | Kogure | 701/80 |
| 2006/0041365 | A1* | 2/2006 | Mori | 701/70 |
| 2007/0208484 | A1* | 9/2007 | Tsujimura et al. | 701/93 |

FOREIGN PATENT DOCUMENTS

| | | |
|---|---|---|
| EP | 1 179 446 A | 2/2002 |
| EP | 1 207 089 A | 5/2002 |
| JP | 8-2274 | 1/1996 |
| JP | 11-64128 | 3/1999 |
| JP | 2002-19489 | 1/2002 |

\* cited by examiner

FIG. 5

| ROAD-SURFACE INFORMATION | | ROAD SURFACE μ | | |
|---|---|---|---|---|
| 5 TYPES | 8 TYPES | 0.9 | 0.5 | 0.1 |
| DRY | DRY | ▨ | | |
| WET | WET | ▨ | | |
| WATER FILM | WATER FILM | | ▨ | |
| SNOW | SHERBET | | ▨ | |
| | FRESH SNOW | | | ▨ |
| | COMPACTED SNOW | | | ▨ |
| ICE | COMPACTED SNOW/ICE SHEET | | | ▨ |
| | ICE FILM | | | ▨ |

ROAD-SURFACE FRICTION COEFFICIENT ESTIMATING DEVICE AND ROAD-SURFACE FRICTION COEFFICIENT ESTIMATING METHOD

BACKGROUND OF THE INVENTION

1. Field of the Invention

The present invention relates to a road-surface friction coefficient estimating device and a road-surface friction coefficient estimating method, and particularly to a method of estimating a road-surface friction coefficient by using an adaptive control theory.

2. Description of the Related Art

A road-surface friction coefficient is used for calculation of control parameters in vehicle control such as traction control, brake force control, torque distribution control or the like. In order to surely perform such control, it is necessary to precisely detect the road-surface friction coefficient. For example, a JP-A-08-2274 and a JP-A-11-64128 that have been already filed by the applicant of the present application disclose technology estimating a road-surface friction coefficient from a steering angle, a vehicle speed and a yaw rate by using an adaptive control theory. According to the JP-A-08-2274, a yaw motion or slide motion of a vehicle is modeled, a yaw motion of an actual vehicle and a modeled yaw motion are compared with each other, and a tire characteristic is momentarily estimated, thereby estimating a road-surface friction coefficient. Furthermore, according to the JP-A-11-64128, a road-surface friction coefficient serving as a base for estimation of a road-surface friction coefficient is set to a predetermined initial value in accordance with a travel environment or a state of a vehicle, whereby the road-surface friction coefficient can be estimated with high precision.

Furthermore, for example, a JP-A-2002-19489 discloses a vehicle-speed controlling device that sets the upper limit value of a vehicle speed smaller as a road-surface friction coefficient decreases, in accordance with the road-surface friction coefficient transmitted from an infrastructure set on a road.

However, with respect to the JP-A-11-64128, the predetermined initial value is properly used according to the situation, however, this initial value may not coincide with the present road-surface friction coefficient. In order to enhance the estimation precision of the road-surface friction coefficient, it is preferable to use an initial value closer to the present road-surface condition, that is, an initial value having higher reliability. Furthermore, the JP-A-2002-19489 discloses control of the vehicle speed by using a road-surface friction coefficient transmitted from an infrastructure, however, it does not disclose any method of autonomously estimating the road-surface friction coefficient by using this value.

SUMMARY OF THE INVENTION

The present invention has been implemented in view of the foregoing situation, and has an object to enhance the estimation precision of the road-surface friction coefficient by using an initial value having high reliability in autonomous estimation of the road-surface friction coefficient.

In order to solve such problems, a first invention provides a road-surface friction coefficient estimating device that updates a road-surface friction coefficient with time lapse based on an estimated present value of the road-surface friction coefficient, thereby estimating the road-surface friction coefficient. The road-surface friction coefficient estimating device includes a specifying unit for specifying the road-surface friction coefficient based on road-surface information detected by a road-side infrastructure in a traveling direction of a vehicle when the road-surface information is acquired, and an estimating unit for setting as an initial value the road-surface friction coefficient thus specified, resetting the present value of the road-surface friction coefficient to the initial value and then starting estimation of the road-surface friction coefficient with the initial value as a standard.

In the first invention, it is preferred that the estimating unit estimates cornering power based on a dynamic equation of the vehicle by using a vehicle speed, a steering angle and a yaw rate, and estimating the present value of the road-surface friction coefficient based on cornering power of front and rear wheels regarding a predetermined road-surface friction coefficient and the cornering power of the front and rear wheels thus estimated. Additionally, it is preferred in the first invention that the specifying unit specifies the road-surface friction coefficient corresponding to the acquired road-surface information from plural road-surface friction coefficients associated with plural pieces of road-surface information. It is preferred in the first invention that the road-surface friction coefficient estimating device further includes an acquiring device for acquiring service information that includes the road-surface information from the road-side infrastructure, and a computer for outputting the road-surface information to the specifying unit in synchronization with an arrival timing at which the vehicle arrives at a point corresponding to the road-surface information specified by the acquired service information.

A second invention provides a road-surface friction coefficient estimating method for estimating a road-surface friction coefficient by updating the road-surface friction coefficient with time lapse based on an estimated present value of the road-surface friction coefficient. The road-surface friction coefficient estimating method includes a first step of specifying the road-surface friction coefficient based on road-surface information detected by a road-side infrastructure in a traveling direction of a vehicle when the road-surface information is acquired, and a second step of setting as an initial value the road-surface friction coefficient thus specified, resetting the present value of the road-surface friction coefficient to the initial value and then starting estimation of the road-surface friction coefficient with the initial value as a standard.

In the second invention, it is preferred that the first step includes a step of specifying the road-surface friction coefficient corresponding to the acquired road-surface information from plural road-surface friction coefficients associated with plural pieces of road-surface information.

BRIEF DESCRIPTION OF THE DRAWINGS

FIG. 5 is a diagram showing an example of a permissible range of an information road surface μ corresponding to road-surface information.

DESCRIPTION OF PREFERRED EMBODIMENT

Figure 1:
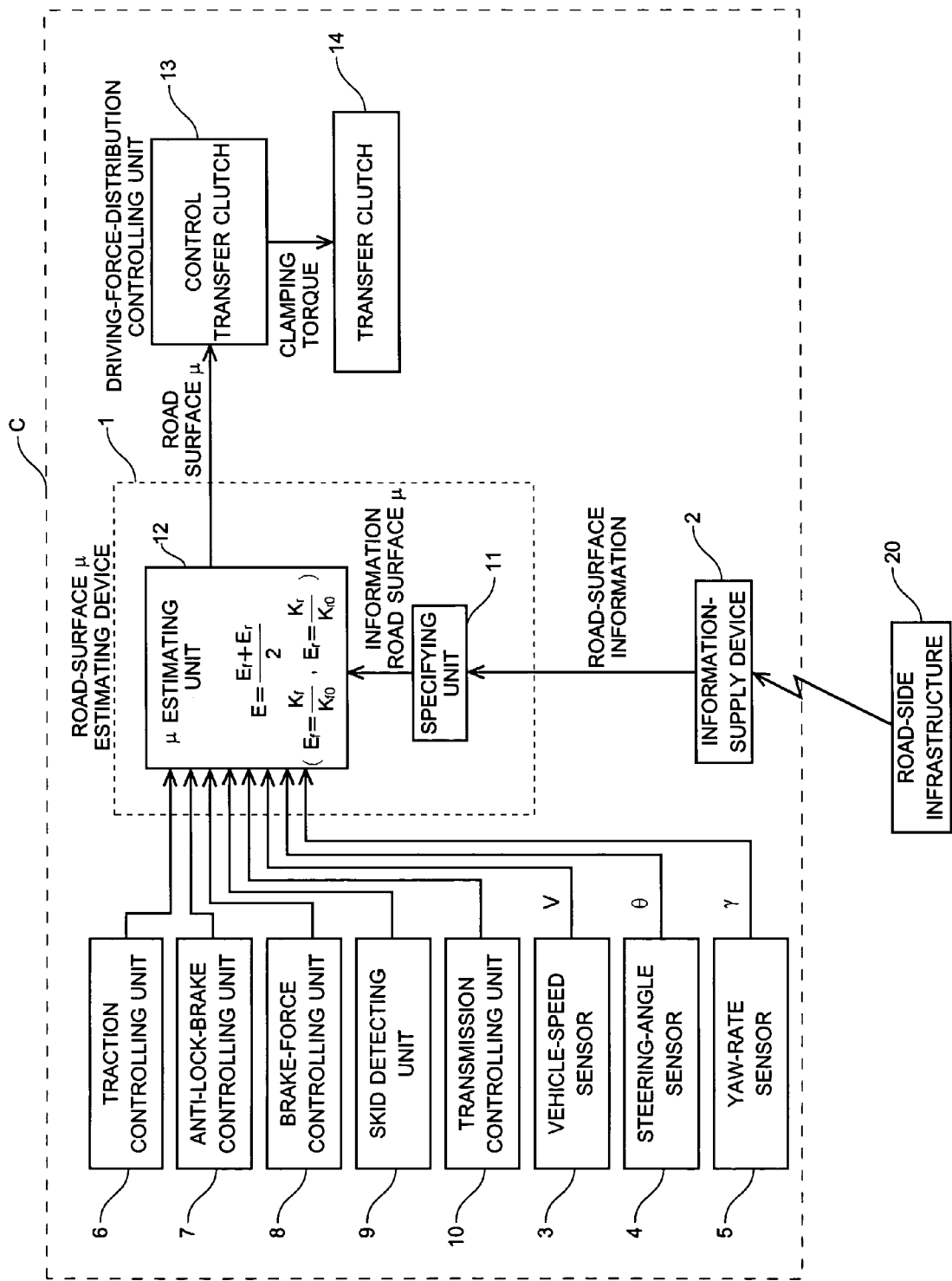
FIG. 1 is a block diagram schematically showing the overall construction of a vehicle using a road-surface friction coefficient estimating device according to the present embodiment.

FIG. 1 is a block diagram schematically showing the overall construction of a vehicle C using a road-surface friction coefficient estimating device according to the present embodiment. A microcomputer comprising a CPU, a RAM, a ROM, an input/output interface, etc. may be used as a road-surface friction coefficient estimating device 1 (hereinafter referred to merely as "a road-surface μ estimating device"). Various kinds of signals are input to the road-surface μ estimating device, by which a road-surface friction coefficient (hereinafter referred to as merely "road-surface μ") corresponding to a road-surface condition is estimated based on these signals. The signals input to the road-surface μ estimating device 1 include road-surface information acquired from an information-supply device 2 in a vehicle travel direction, and detection signals (a vehicle speed V, a steering angle θ and a yaw rate γ) acquired from sensors 3 to 5. In addition to these signals, actuation signals are input from respective controlling units 6 to 8 if a traction controlling unit 6, an anti-lock-brake controlling unit 7 and a brake-force controlling unit 8 are actuated, and also a skid detection signal is input if skidding is detected by a skid detecting unit 9. Furthermore, there is also input a signal indicating selected one of two kinds of travel patterns that are a normal pattern and a power pattern (a pattern having a broader travel area than the normal pattern under a low gear) under the transmission control of a transmission controlling unit 10. Besides this signal, a signal indicating whether one range is selected or not is also input.

The information-supply device 2 is generally an in-vehicle device installed in the vehicle C, in a transportation system called an AHS. In the AHS, information regarding transportation is supplied to the vehicle C side by communication between the information-supply device 2 and a road-side infrastructure 20. A variety of information supplies is scheduled for operation in the AHS, in connection with traffic condition. In the present embodiment, a road-surface-information-supply assisting service (hereinafter referred to merely as "a road-surface information service") that is one of these services is used, whereby road-surface information in a vehicle travel direction that is detected by the road-side infrastructure 20 is output from the information-supply device 2 to the road-surface μ estimating device 1.

Figure 2:
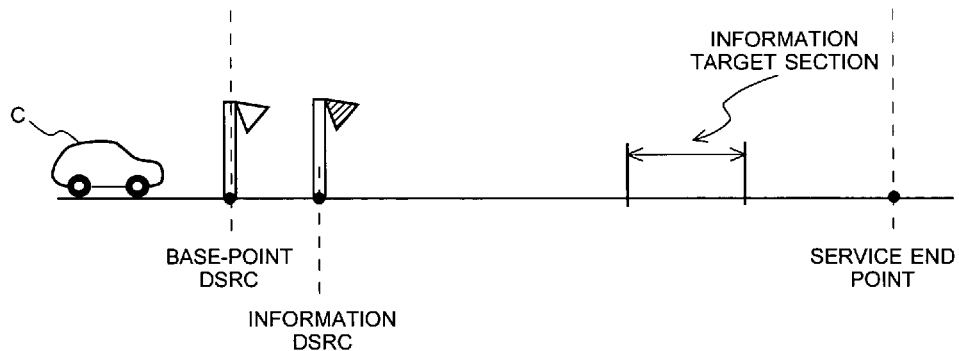
FIG. 2 is a diagram showing a road-side infrastructure.

Here, the road-side infrastructure 20 will be first described with reference to FIG. 2. The road-side infrastructure 20 is mainly constructed by DSRCs (Dedicated Short Range Communications), which are arranged continuously or discretely. The DSRC transmits information to the vehicle C (specifically, the information-supply device 2) through spot communications using a predetermined radio frequency band (for example, a 5.8 GHz band). Considering the DSRC functionally, the DSRC is classified into a base-point DSRC and an information DSRC.

The base-point DSRC is a DSRC that indicates start of a service and serves as a positional standard as well as transmits base-point information. The information DSRC transmits service information. Specifically, the service information includes the type of the service, an active/inactive state of the service, a position of an information target section, a service end point, information required by every service, etc. Here, "the information required by every service" means individual information serving as an information target in each service, and corresponds to road-surface information of the information target section, which is evaluated with five stages of dry, wet, water film, snow and ice in the road-surface information service, for example. Information transmitted from these DSRCs is collectively managed by a base station (not shown). The base station monitors road-surface conditions in information target sections set on a road at predetermined intervals (for example, 100 msec), and creates/updates the service information as occasion demands. Therefore, the road-surface information transmitted through the information DSRC reflects the present road-surface condition of the road.

Figure 3:
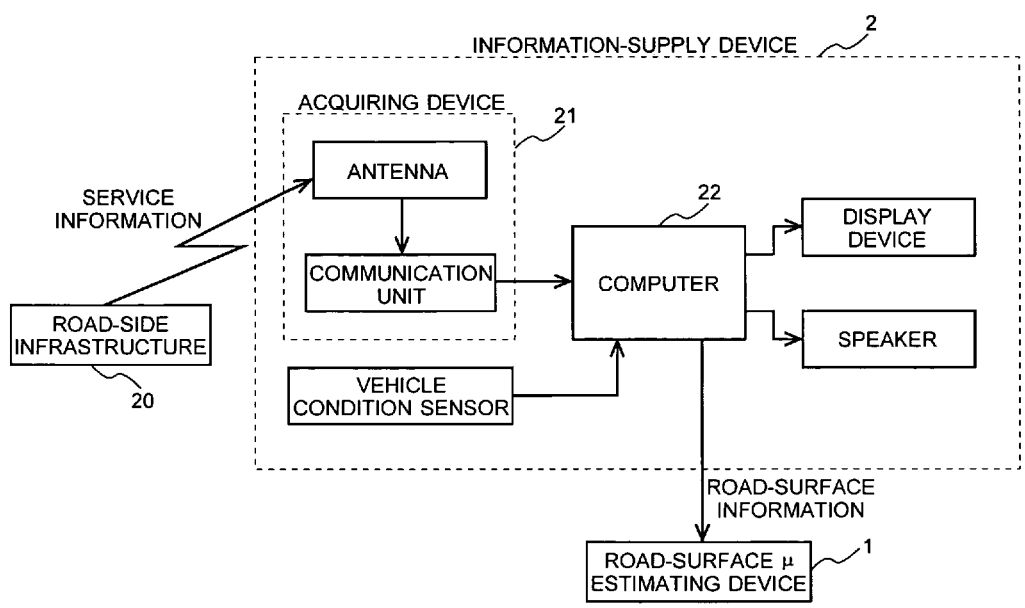
FIG. 3 is a block diagram showing the overall construction of an information-supply device.

FIG. 3 is a block diagram showing the overall construction of the information-supply device 2. The information-supply device 2 is mainly constructed by an acquiring device 21 and a computer 22. The acquiring device 21 acquires the base-point information and the service information transmitted from the DSRCs, and outputs this information to the computer 22. Since information transmission from the DSRCs is carried out in a wireless communication style, the acquiring device 21 is constructed by a well known antenna and communication unit. As the computer 22 may be used a microcomputer mainly comprising a CPU, a ROM, a RAM, an input/output interface, etc. If the type of the service information output from the acquiring device 21 is the road-surface information service, the computer 22 specifies the road-surface information in information contained in the service information concerned. Subsequently, the computer 22 outputs this road-surface information to the road-surface μ estimating device 1 in synchronism with an arrival timing of the vehicle C arriving at the information target section. The vehicle speed V, a blinking state of a turn signal, etc. detected by a vehicle condition sensor are input to the computer 22. For example, the computer 22 can detect an absolute position of the vehicle C concerned with the base-point DSRC as a standard by calculating an accumulated travel distance based on the vehicle speed V. The computer 22 may supply the service information thus acquired to a driver through a display device or a speaker.

The road-surface t estimating device 1 will be described by referring to FIG. 1 again. A vehicle-speed sensor 3, a steering-angle sensor 4 and a yaw-rate sensor 5 are well known sensors used for detecting the vehicle speed V, the steering angle θ and the yaw rate γ, respectively.

The traction controlling unit 6 detects a skidding rate of each wheel based on the speed of each wheel. If the skidding rate becomes higher than or equal to a predetermined set value, a predetermined control signal is output to a brake driving unit (not shown) for independently driving each of brake mechanisms (for example, wheel cylinders) of right/left and front/rear wheels to brake the vehicle C. In connection with this braking operation, a predetermined control signal is output to an engine controlling unit (not shown) to decrease a torque applied to an engine (not shown). The anti-lock-brake controlling unit 7 judges based on the rotational state of each wheel and the vehicle speed whether actuation of an anti-lock brake is necessary or not, if a driver stamps on a brake pedal. If it is judged that the actuation of the anti-lock brake is necessary, the anti-lock-brake controlling unit 7 selects any one hydraulic pressure mode of increase in pressure, maintenance of pressure and decrease in pressure, and outputs a control signal corresponding to the mode thus selected to the brake driving unit. The brake-force controlling unit 8 calculates a target brake force for correcting an under-steer aptitude or over-steer aptitude of the vehicle C as occasion demands, and selects a wheel to which this target brake force should be applied. Subsequently, a control signal is output to the brake driving unit so that the target brake force is applied to the selected wheel, thereby controlling the brake force. As described above, if the respective controlling units 6 to 8 are actuated, the respective actuation signals are output to the road-surface µ estimating device 1.

The skid detecting unit 9 judges a skidding state of each wheel based on the rotational speed of each wheel. The transmission controlling unit 6 automatically selects one of two kinds of travel patterns that are a normal pattern and a power pattern (or a driver arbitrarily selects using a switch), and controls transmission according to the shift pattern thus selected.

Considering the road-surface µ estimating device 1 functionally, it comprises a specifying unit 11 and an µ estimating unit 12. The specifying unit 11 acquires the road-surface information output from the information-supply device 2, and specifies the road surface µ (hereinafter referred to as "an information road surface µ) based on this road-surface information. The relationship between the road-surface information and the information road surface µ is preset with a map generated through a simulation, an experiment or the like. Therefore, the corresponding relationship between the road-surface information and the information road surface µ is stored in the ROM of the microcomputer. A table 1 represents the corresponding relationship between the road-surface information and the information road surface µ.

TABLE 1

| ROAD-SURFACE INFORMATION | INFORMATION ROAD SURFACE µ |
|---|---|
| Dry (a condition with no water on the road surface) | 0.8 |
| Wet (a condition in which the road surface is wet) | 0.7 |
| Water film (a condition with a water layer formed on the road surface) | 0.5 |
| Snow (a condition with snowflakes, soft hail, hail or the like covering the road surface) | 0.3 |
| Ice (a condition with snowflakes or water frozen on the road surface) | 0.2 |

The µ estimating unit 12 calculates an estimation value E of the road surface µ. In order to calculate the estimation value E, the µ estimating unit 12 calculates parameters (specification data) based on the dynamic equation of a vehicle by using the detected vehicle speed V, the steering angle θ and the yaw rate γ. Specifically, the dynamic equation of the vehicle is represented by state variables, a parameter adjustment rule is set and the adaptive control theory is developed to thereby estimate various parameters. Cornering powers Kf and Kr of front and rear wheels are calculated based on the parameters thus estimated, and the estimation value E is calculated based on the cornering powers Kf and Kr.

In the case that a parameter estimated by a change of the yaw rate y is represented by "a" and a parameter estimated by the steering angle θ is represented by "b", the cornering powers Kf and Kr of the front and rear wheels satisfy the following equation, for example.

$$Kf = b \cdot Iz \cdot n/2Lf$$

$$Kr = (a \cdot Iz + Lf \cdot Kf)/Lr \quad \text{[Equation 1]}$$

By using each of the cornering powers Kf and Kr thus estimated, the estimation value E of the road surface µ is calculated according to the following equation.

$$E = (Ef + Er)/2$$

$$Ef = Kf/Kf0$$

$$Er = Kr/Kr0 \quad \text{[Equation 2]}$$

Here, "Ef" represents an estimation value of the road surface µ at a front wheel side, and "Er" represents an estimation value of the road surface p at the rear wheel side. "Kf0" represents a cornering power (hereinafter referred to as "an equivalent cornering power") achieved in consideration of effects of rolling and suspension of the front wheels at a predetermined road surface µ (for example, a high µ). Likewise, "Kr0" represents an equivalent cornering power of the rear wheels on a high µ road. As understood from this equation, the estimation value E is calculated from the average value of the estimation values Ef and Er of the road surface µ at the front wheel side and the rear wheel side respectively.

In principle, the µ estimating unit 12 sets the calculated estimation value E as the road surface µ (a present value) corresponding to the present road-surface condition, and outputs this value to a driving-force-distribution controlling unit 13. The driving-force-distribution controlling unit 13 determines a clamping torque of a transfer clutch 14 formed between two output parts of a center differential device (not shown) based on the road surface µ. The relationship between the road surface µ and the clamping torque is preset with a map or a function expression generated through a simulation, an experiment or the like. The transfer clutch 14 is actuated according to the clamping torque thus determined, and the torque distribution of front and rear wheels is controlled, whereby steering stability, turning performance and resting performance can be enhanced. The details of the method of calculating the estimation value E of the road surface µ and the driving-force-distribution controlling method based on the estimation value E are disclosed in the JP-A-08-2274 and the JP-A-11-64128, which have been already filed by the applicant of the present application, and may be referred to if necessary. Not clearly shown in FIG. 1, the µ estimating unit 12 may output the road surface µ to the traction controlling unit 6, the brake-force controlling unit 8 or the like.

Here, one feature of the present embodiment resides in that when the µ estimating unit 12 sets the estimation value E as the road surface µ corresponding to the present road-surface condition, it resets the estimation value E to a preset initial value as occasion demands. The reason why the initial value is used in place of the estimation value E is to enhance the estimation precision of the road surface µ. The estimation of the road surface µ to which the adaptive control theory is applied is carried out based on such an integrating operation that an actual road surface µ is higher or lower than the estimation value E. In other words, the road surface µ is estimated by updating the road surface µ with time lapse based on the estimation value E of the road surface µ. For example, a present value µ0 of the road surface µ estimated at some time t0 is used as a standard for a next estimation of the road surface µ (µ1) (time t1: t0<t1), and the road surface µ (µ1) thus estimated is used as a standard for a further next estimation of a road surface µ (µ2) (time t2: t1<t2).

However, when the road surface µ is varied, the road surface µ estimated initially after the variation is greatly different from the actual road surface µ. This is because the estimating method described in the present embodiment uses the integrating operation, and thus, when the road surface µ is varied to some great degree, the integrating operation cannot follow this variation. Therefore, much time is required until a proper estimation result of the road surface µ is acquired. Furthermore, it is difficult to estimate a sufficient road surface µ under such a travel condition that a vehicle travels straight with no steering.

Therefore, according to the present embodiment, these disadvantages can be overcome by properly resetting the estimation value E to the initial value, that is, giving the initial value with interruption. The information road surface μ corresponding to the road-surface information described above may be used as the initial value. As occasion demands, the initial value includes a predetermined value (for example, 0.3) used when various kinds of signals are input from the respective controlling units 6 to 8, 10 and the skid detecting unit 9 or a predetermined value (for example, 0.5) used when it is judged that a vehicle has been stopped for a long period.

Figure 4:
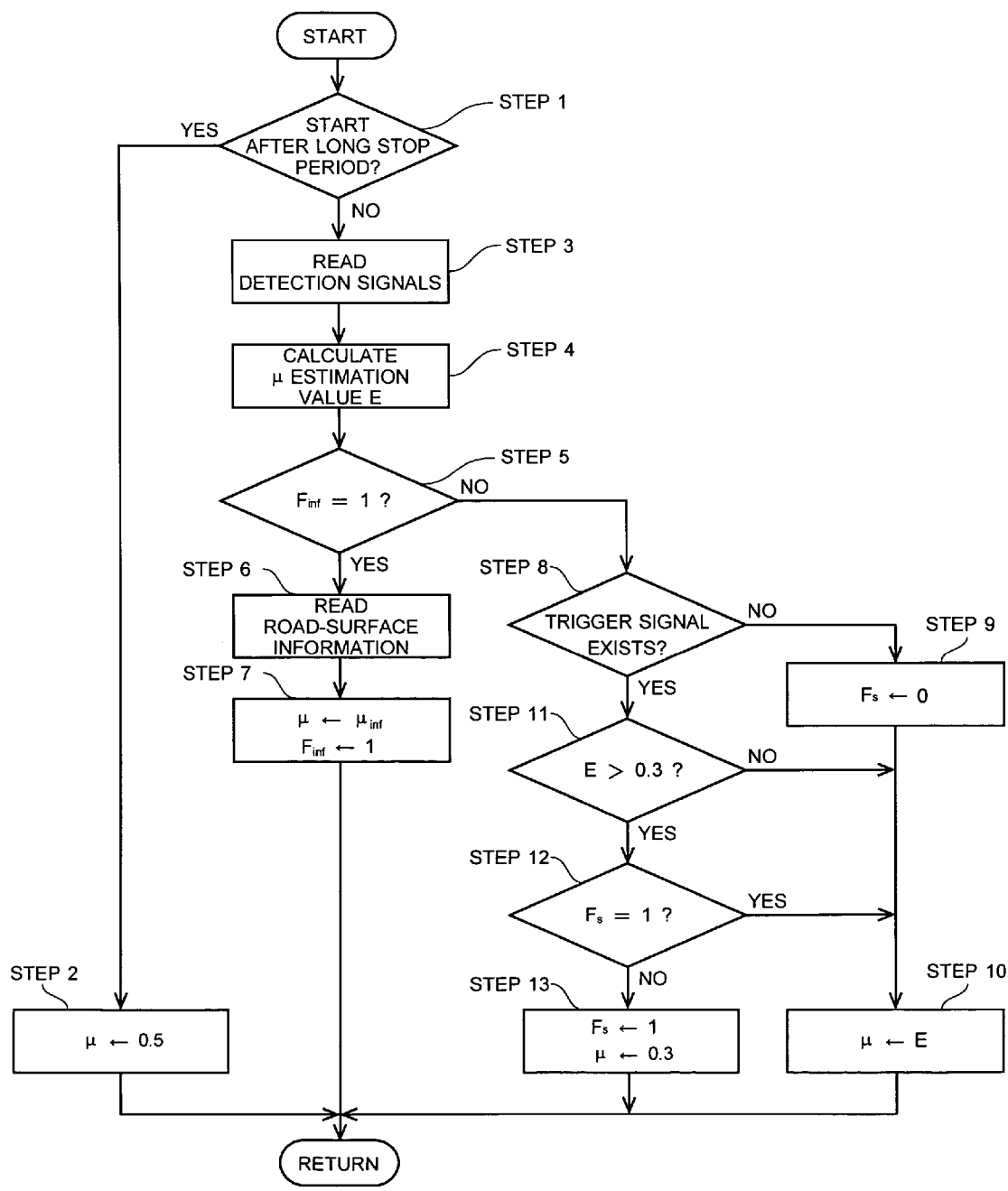
FIG. 4 is a flowchart showing an estimating procedure of a road-surface friction coefficient according to the present embodiment.

The method of estimating the road surface μ will be described below. FIG. 4 is a flowchart showing the estimating process of the road surface μ according to the present embodiment. The process or the routine shown in the flowchart is called at a predetermined interval and executed by the road-surface μ estimating device 1 during a period from the time when an engine is started by turning on an ignition switch (not shown) until the time when the engine is stopped by turning off the ignition switch, that is, in one driving cycle.

First, it is judged in step 1 whether the engine is started after a long stop period of a vehicle. Here, the "long stop period" of "after a long stop period of a vehicle" means such a period necessary for shipping the vehicle or exchanging a unit at a dealer or the like. When the engine is started after the long stop period, it may be considered that much time has elapsed since the time when the engine was previously stopped. Therefore, there is a probability that a road-surface condition before the long stop period is different from the present road-surface condition because of frost or rainfall on the road. At a normal re-start time of the engine, the road surface μ (the estimation value E) is estimated based on the cornering powers Kf and Kr that are estimated in the previous driving cycle and stored in a backup RAM. However, in the above case, there is a probability that the estimated road surface μ and the actual road surface μ are greatly different from each other due to the difference in the road-surface conditions. Therefore, after the long stop period, the judgment of the step 1 is provided prior to an operation process of step 4 in order to prevent from executing estimation of the road surface μ based on the cornering powers Kf and Kr estimated in the previous driving cycle.

If a positive judgment is made in the step 1, that is, if the engine is started after the long stop period, the process shifts to step 2. In the step 2, the road surface μ is reset to an initial value (for example, 0.5) in an intermediate area between a high μ area and a low μ area, and then this routine is terminated. Accordingly, in the next cycle, estimation of the road surface μ is started with the initial value as a standard. On the other hand, if a negative judgment is made in the step 1, that is, if the engine is started after a period that is not regarded as the long stop period, else if the engine has been already started and thus the present driving cycle is a second or subsequent cycle, the process shifts to step 3.

In the step 3, detection signals from the sensors 3 to 5 that are the vehicle speed V, the steering angle θ and the yaw rate γ are read in. In the step 4, the estimation value E of the road surface μ is calculated based on the adaptive control theory shown in the equations 1 and 2 by using the vehicle speed V, the steering angle θ and the yaw rate γ.

In step 5, it is judged whether a road-surface information flag Finf is set to "1". The road-surface information flag Finf is initially set to a value "0", where a value "1" indicates that the road-surface information is input from the information-supply device 2 in the present cycle. Therefore, if the road-surface information flag Finf is changed from "0" to "1" at some timing, the processes of step 8 and the subsequent steps are skipped according to the positive judgment of the step 5, and then the process shifts to step 6. In the step 6, the road-surface information is read in. In step 7 subsequent to the step 6, the road surface μ is reset to the information road surface (μinf) corresponding to the road-surface information (an updating process), the road-surface information flag Finf is set to "0", and then the routine is terminated. Accordingly, in the next cycle, the estimation of the road surface μ is started with the information road surface μ as a standard. On the other hand, if a negative judgment is made in the step 5, the process shifts to the step 8.

In the step 8, it is judged whether a trigger signal is input. The trigger signal includes the actuation signals of the controlling unit 6 to 8, the skid detection signals of the skid detecting unit 9, and the signal based on the power pattern selection or the one range selection. This trigger signal is generated in at least one of a case where the vehicle C is skidded and a case where the vehicle C travels on a low μ road. If a negative judgment is made in the step 8, that is, if any of these signals is not input, the process shifts to step 9. In the step 9, a μ-variation identifying flag Fs is reset to "0". Here, the μ-variation identifying flag Fs is a flag for identifying whether the road-surface condition is varied to the low μ area, and it is set to "1" only if the trigger signal is input. In step 10, the road surface μ is set to the estimation value E calculated in the step 4, and then the routine is terminated. Accordingly, in the next cycle, the estimation of the road surface μ is started with the estimation value E as a standard. On the other hand, if a negative judgment is made in the step 8, that is, if at least one trigger signal is input, the process shifts to step 11.

In the step 11, it is judged whether the calculated estimation value E is larger than the value of the low μ area, for example, 0.3. Here, the reason why the estimation value E is compared with the value of the low μ area is to evaluate reliability of the estimation value E. As described above, the trigger signal is input in at least one of the skidding case of the vehicle C and the low-μ-road traveling case, and indicates that the road surface μ exists in the low μ area. Therefore, by comparing the estimation value E with a representative value (0.3 in the present embodiment) of the low μ area, it is judged whether the road surface μ is accurately estimated. If a negative judgment is made in the step 11 (the estimation value E≦0.3), the estimation value E is estimated in the low μ area, and thus the reliability thereof is high. Then, the process shifts to the step 10. After the road surface μ is set to the estimation value E (the step 10), and then the routine is terminated. On the other hand, if a positive judgment is made in the step 11 (the estimation value E>0.3), it is judged that the reliability of the estimation value E may be low, and thus the process shifts to step 12.

In the step 12, it is judged whether the i-variation identifying flag Fs is set to "1". If a positive judgment is made in the step 12, that is, if the trigger signal is also input in the previous cycle, it is judged that the road surface μ still exits in the low μ area. In other words, it is judged that the road-surface condition is not different between the previous cycle and the present cycle. In this case, even if the estimation value E is larger than 0.3, the estimation value E is estimated to be an accurate value based on the calculation result, and thus the process shifts to the step 10. The road surface μ is set to the estimation value E (the step 10 ), and then the routine is terminated. On the other hand, if a negative judgment is made in the step 12, that is, if no trigger signal is input in the previous cycle, it is judged that the road surface μ is varied to the low μ area as compared with the road surface μ in the previous cycle. In other words, it is judged that the road-surface condition is different between the previous cycle and the present cycle, and the process shifts to step 13. In the step 13, the flag Fs is set to "1", and the road surface μ is reset to an initial value (for example, 0.3) closer to a low μ. Thereafter, the routine is terminated. Accordingly, in the next cycle, the estimation of the road surface μ is started with this initial value as a standard.

As described above, according to the present embodiment, the information road surface μ is specified based on the road-surface information detected by the road-side infrastructure 20. The road-surface condition detected by the road-side infrastructure 20 reflects the present road-surface condition, and thus the information road surface μ corresponds to the actual road surface μ. If the information road surface μ is input to the estimating unit 12, the estimation value E of the road surface μ acquired from the detection signals of the sensors 3 to 5 is reset to the information road surface μ. Accordingly, the estimating unit 12 starts the estimation of the road surface μ with this initial value as a standard in the next cycle, whereby the road surface μ can be estimated from a value close to the actual road surface μ, so that the estimation precision of the road surface p can be enhanced. Furthermore, according to requirements of the AHS system, since the road-surface information is supplied at points where variation of road surface such as frost or the like occurs frequently, the above disadvantage occurring when the road surface μ varies can be solved by forcedly initializing the road surface μ to the information road surface μ. Furthermore, even under the travel condition that a vehicle travels straight with no steering, the road-surface information is supplied and the information road surface μ is set to the initial value, whereby the road surface μ can be estimated effectively.

As described above, the road-surface information supplied from the road-side infrastructure 20 includes a road condition in an information supply section supplied spot by spot. Therefore, if the road-surface information thus supplied is fixed as a value of the road surface μ, there occurs a problem that the road surface μ concerned is a proper value inside the information target section, but is an improper value different from the actual road-surface condition outside the information target section. However, according to the present embodiment, the road-surface information (the information road surface μ) detected by the road-side infrastructure 20 is set as the present road surface μ, however, this value is merely set as an initial value. The road surface μ corresponding to the road-surface condition is autonomously estimated on the basis of this initial value in accordance with the travel condition of the vehicle C with time lapse. Therefore, the precise road surface μ can be estimated irrespective of the inside or outside of the information target section.

Furthermore, according to the present embodiment, if the vehicle C is starting after the long stop period, the road surface μ is forcedly initialized to a value in an intermediate area between the high μ area and the low μ area. Therefore, even in the case of starting after the long stop period on one of a high μ road and a low μ road, reduction of response in control can be suppressed. In the case of at least one of the skidding of the vehicle C and the low μ road travel (at the time when a trigger signal is input), the initial value is set to the value in the low μ area. Accordingly, the road surface μ can be estimated from a value close to the actual road surface μ, and thus the response in control can be enhanced.

In the present embodiment, the corresponding relationship between the road-surface information and the information road surface μ is shown in the table 1, however, the present invention is not limited to this mode. Any value may be selected as the information road surface μ corresponding to the road-surface information in some range that can be assumed on the basis of the road-surface information. FIG. 5 is a diagram showing an example of a permissible range of the information road surface l corresponding to the road-surface information. In FIG. 5, the permissible range of the road surface μ corresponding to the road-surface information is illustrated as being hatched. For example, when the road-surface information is "dry", any value in the range from 0.7 to 0.9 may be selected as the information road surface μ. Furthermore, in the above embodiment, the road-surface information is classified into the five types. However, if the information road surface μ is specified with higher precision, the road-surface information may be classified into eight types, to which the road surface μ may be associated with. In this case, reliability of the information road surface μ functioning as the initial value is high, and thus the road surface μ can be more accurately estimated. Furthermore, a function expression is preset based on the knowledge that the road surface μ varies in accordance with the speed, and the information road surface μ may be specified in consideration of the road-surface information and the present vehicle speed.

As the trigger signals are used the signals from the traction controlling unit 6, the anti-lock-brake controlling unit 7, the brake-force controlling unit 8, the skid detecting unit 9 and the transmission controlling unit 10. However, the present invention is not limited to the mode in which all the above signals are used. Furthermore, in addition to these signals, an actuation signal of a wiper, a low ambient temperature signal indicating that the ambient temperature is less than or equal to a predetermined ambient temperature, etc. may be used as the trigger signal.

In the present embodiment, the specifying unit 11 is equipped to the road-surface μ estimating device 1. However, the information-supply device 2 may have the function of the specifying unit 11. For example, the map described above is stored in the ROM of the computer 22 included in the information-supply device 2, and the information road surface μ is output instead of the road-surface information. In this construction, the specifying unit 11 may be omitted. However, the present embodiment has an advantage that an existing information-supply device 2 can be directly used.

According to the present invention, the road-surface friction coefficient (the initial value) is specified based on the road-surface information detected by the road-side infrastructure. Since the road-surface condition detected by the road-side infrastructure reflects the present road-surface condition, the road-surface friction coefficient thus specified corresponds to the actual road-surface friction coefficient. When the road-surface friction coefficient acquired from the specifying unit is input to the estimating unit, the present value of the road-surface friction coefficient is reset to the initial value. Accordingly, the estimating unit starts estimation of the road-surface friction coefficient on the basis of this initial value, so that the road-surface friction coefficient can be estimated from a value close to the actual road-surface friction coefficient. Thus, the estimation precision of the road-surface friction coefficient can be enhanced.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

Additionally, the disclosure of Japanese Patent Application No. 2003-192797 filed on Jul. 7, 2003 including the specification, drawing and abstract is incorporated herein by reference in its entirety.

What is claimed is:

1. A road-surface friction coefficient estimating device for estimating a road-surface friction coefficient by updating the road-surface friction coefficient with time lapse by using an estimated present value of the road-surface friction coefficient as a standard for a next estimation of the road-surface friction coefficient, comprising:

a specifying unit for specifying the road-surface friction coefficient based on road-surface information detected by a road-side infrastructure in a traveling direction of a vehicle when the road-surface information is acquired; and an estimating unit for setting the specified road-surface friction coefficient as an initial value, resetting the estimated present value of the road-surface friction coefficient to the initial value and then starting next estimation of the road-surface friction coefficient with the initial value as a standard for a next estimation of the road-surface friction coefficient, wherein the specifying unit previously stores plural road-surface friction coefficients corresponding to plural pieces of road-surface information, and wherein the specifying unit specifies the road-surface friction coefficient corresponding to the acquired road-surface information from the plural road-surface friction coefficients associated with the plural pieces of road-surface information.

2. The road-surface friction coefficient estimating device as claimed in claim 1, further comprising:

an acquiring device for acquiring service information that includes the road-surface information from the road-side infrastructure; and a computer for outputting the road-surface information to the specifying unit in synchronization with an arrival timing at which the vehicle arrives at a point corresponding to the road-surface information specified by the acquired service information.

3. The road-surface friction coefficient estimating device as claimed in claim 1, wherein the estimating unit estimates cornering power based on a dynamic equation of the vehicle by using a vehicle speed, a steering angle and a yaw rate, and estimating the present value of the road-surface friction coefficient based on cornering power of front and rear wheels regarding a predetermined road-surface friction coefficient and the cornering power of the front and rear wheels thus estimated.

4. The road-surface friction coefficient estimating device as claimed in claim 3, wherein the specifying unit specifies the road-surface friction coefficient corresponding to the acquired road-surface information from plural road-surface friction coefficients associated with plural pieces of road-surface information.

5. The road-surface friction coefficient estimating device as claimed in claim 3, further comprising:

an acquiring device for acquiring service information that includes the road-surface information from the road-side infrastructure; and a computer for outputting the road-surface information to the specifying unit in synchronization with an arrival timing at which the vehicle arrives at a point corresponding to the road-surface information specified by the acquired service information.

6. The road-surface friction coefficient estimating device as claimed in claim 1, further comprising:

an acquiring device for acquiring service information that includes the road-surface information from the road-side infrastructure; and a computer for outputting the road-surface information to the specifying unit in synchronization with an arrival timing at which the vehicle arrives at a point corresponding to the road-surface information specified by the acquired service information.

7. The road-surface friction coefficient estimating device as claimed in claim 1, wherein said road-surface friction coefficient is estimated based on a vehicle speed, a steering angle, and a yaw rate.

8. The road-surface friction coefficient estimating device as claimed in claim 1, wherein the road surface information comprises information related to at least one of a dry condition, a wet condition, a water film condition, a snow condition, and an ice condition.

9. The road-surface friction coefficient estimating device as claimed in claim 1, wherein the estimating unit gives the initial value with interruption.

10. The road-surface friction coefficient estimating device as claimed in claim 1, wherein said estimating unit receives said road-surface information from the road-side infrastructure and detections signals from at least one on-vehicle sensor.

11. The road-surface friction coefficient estimating device as claimed in claim 10, wherein said at least one on-vehicle sensor detects a vehicle speed, a steering angle, and a yaw rate.

12. The road-surface friction coefficient estimating device as claimed in claim 10, wherein said estimating unit receives actuating signals from at least one of a traction controlling unit, an anti-lock brake controlling unit, a brake-force controlling unit, a skid detecting unit, and a transmission controlling unit.

13. The road-surface friction coefficient estimating device as claimed in claim 12, wherein the transmission controlling unit inputs a signal indicating a selected one of a plurality of travel patterns, the plurality of travel patterns including a normal pattern and a pattern having a broader travel area than the normal pattern under a low gear.

14. The road-surface friction coefficient estimating device as claimed in claim 1, wherein said road-surface friction coefficient is estimated based on cornering powers of wheels of the vehicle.

15. A road-surface friction coefficient estimating method for estimating a road-surface friction coefficient by updating the road-surface friction coefficient with time lapse by using an estimated present value of the road-surface friction coefficient as a standard for a next estimation of the road-surface friction coefficient, comprising:

specifying the road-surface friction coefficient based on road-surface information detected by a road-side infrastructure in a traveling direction of a vehicle when the road-surface information is acquired; and setting the specified road-surface friction coefficient as an initial value, resetting the estimated present value of the road-surface friction coefficient to the initial value and then starting next estimation of the road-surface friction coefficient with the initial value as a standard for a next estimation of the road-surface friction coefficient, wherein plural road-surface friction coefficients corresponding to plural pieces of road-surface information are previously stored, and wherein the road-surface friction coefficient is specified corresponding to the acquired road-surface information from the plural road-surface friction coefficients associated with the plural pieces of road-surface information.

16. The method according to claim 15, wherein said setting is performed with interruption.

17. A road-surface friction coefficient estimating method, comprising:
   setting a specified road-surface friction coefficient as an initial value of the road-surface friction coefficient;
   resetting a present value of the road-surface friction coefficient to the initial value; and
   estimating the road-surface friction coefficient with the initial value as a standard for a next estimation of the road-surface friction coefficient.

18. The method according to claim 17, wherein said setting is performed with interruption.

19. A road-surface friction coefficient estimating device for estimating a road-surface friction coefficient by updating the road-surface friction coefficient with a time lapse by using an estimated present value of the road-surface friction coefficient, comprising:
   a specifying unit for specifying the road-surface friction coefficient based on road-surface information detected by a road-side infrastructure in a traveling direction of a vehicle when the road-surface information is acquired; and
   an estimating unit for estimating a present value of the road-surface friction coefficient based on an estimated previous value of the road-surface friction coefficient when the road-surface information is not acquired, and for estimating the present value of the road-surface friction coefficient as a specified road-surface friction coefficient when the road-surface information is acquired.

* * * * *